(No Model.) 2 Sheets—Sheet 2.

J. G. SMITH.
ELECTRICAL SUCCESSION SIGNALING OR CALLING SYSTEM.

No. 547,942. Patented Oct. 15, 1895.

Fig. 4.

WITNESSES:
Edward C. Rowland.
M. B. Harris

INVENTOR
Jas. G. Smith
BY
T. F. Bourne
his ATTORNEY

UNITED STATES PATENT OFFICE.

JAMES G. SMITH, OF NEW YORK, N. Y., ASSIGNOR OF ONE-HALF TO ROBERT G. VASSAR, OF SAME PLACE.

ELECTRICAL SUCCESSION SIGNALING OR CALLING SYSTEM.

SPECIFICATION forming part of Letters Patent No. 547,942, dated October 15, 1895.

Application filed January 14, 1895. Serial No. 534,758. (No model.)

*To all whom it may concern:*

Be it known that I, JAMES G. SMITH, a resident of New York city, county and State of New York, have invented an Improved Electrical Succession Signaling or Calling System, of which the following is a specification.

My invention pertains to a signaling or calling system wherein several stations or calling devices are located in a circuit and so arranged that a party at one station can signal to or call any other station on the circuit without signaling any other station. In combination with this signaling or calling system I may utilize a telephone or telegraph circuit arranged so that the party signaled or called can make telephonic connection with the calling-station.

One of the main objects of my invention is to so arrange the elements of the system that the devices for selecting one station from another shall operate by electricity in contradistinction to devices which operate mechanically for that purpose—such as clockworks and step-by-step devices, which work in unison throughout the system when released.

In carrying out my invention I provide a circuit with which are connected any desired number of signaling devices, such as call-bells, that are located on spur-wires leading from said circuit, each of which spur-wires may have a separate ground, the signaling devices thereby constituting stations. The spur-wires for the call-bells are provided with make-and-break contacts that are adapted to be operated by magnets in a normally-closed circuit provided with shunts around said magnets to keep the current in said normally-closed circuit from permanently energizing said magnets, the shunts having contacts to be broken by the armatures of said magnets; but when said magnets are energized their armatures will act to break the circuits through said call-bells and the shunts. The shunts around said magnets are arranged to be broken by magnets located on spur-wires leading from a main circuit passing through all the stations, the armatures of which magnets are adapted to break the circuits through said shunts. These spur-wires each lead to ground, and when their magnets are energized their normal-ground circuits are broken (by the magnets in said permanently-closed circuit) and a new ground is established, so as to keep said magnets energized for a space of time. When these magnets are energized, their armatures break the shunt-circuits and allow the current in the first-mentioned closed circuit to energize the magnets therein whose armatures cause the breaking of the circuits through the bells to prevent the bells in any stations between two connecting stations from being operated. Provision is also made for breaking the circuit through the normally-closed line to restore the armatures and circuits to their normal conditions. Thus by means of my system the call-bells or signaling devices are all normally in a completed circuit with a line passing through the stations, and when one bell or signaling device is to be operated at a desired station all the bells or signaling devices between that one and the calling-station have their individual circuits broken, so as to leave a through line between the calling-station and the bell at the called station. By preference I provide a suitable switch-box, containing make-and-break devices for operating the several magnets at the stations successively to break the circuits through the call-bells between the station calling and the station to be called, so that only the desired station will be called without requiring the operator to understand a code or the number of pulsations to be sent. A suitable telephone-circuit is provided with instruments to enable parties at two stations to communicate after one station has called another. By the means above described a party at one station sends a certain number of pulsations through the circuit having the magnets that break the circuits through the shunts, so as to successively cut out the bells between his station and the station desired, thus leaving the call-bell in the latter station in circuit, whereby he can then operate the bell at the station he wishes to communicate with. When finished, he breaks the circuits through the magnets on the normally-closed line to restore the circuits through all the bells, as well as normal grounds, through the magnets that break the shunt-circuits, also restoring the circuits through said shunts.

The invention also consists in the novel details of improvement and the combinations of parts, that will be more fully hereinafter set forth, and then pointed out in the claims.

Reference is to be had to the accompanying drawings, forming part hereof, wherein—

In the accompanying drawings, in which similar letters and numerals of reference indicate corresponding parts in the several views, the numeral 1 indicates a main wire for the signaling devices or call-bells 2.

A B C are stations, at each of which a call-bell 2 is located, the wire 1 passing through said stations, any suitable number of said stations and bells being located on a circuit 1. The call-bells 2 are connected by a spur-wire 3 to ground 4, whereby a circuit is formed from 1 through 3 to ground. In the circuit 3 is a make-and-break device, shown consisting of a pivoted arm 5, having a spring 6 to keep it in engagement with a contact 7, that leads by wire 3ᵃ to ground 4. By moving the arm 5 the circuit through the bell will be broken. By means of a suitable push-button, key, or switch 8, located on the wire 1, the bell 2 can be operated.

9 is a normally-closed line-wire having grounds 10 and battery 11, said wire passing through all the stations.

12 are magnets on the wire 9 at each station and adapted to be energized by the current in said wire.

13 represents the spring-actuated armatures for the magnets 12, which armatures are adapted when attracted by the magnets 12 to move the arms 5 to break the circuits through the bells 2. Insulation 14 is located between the armature 13 and the arm 5, being shown carried by said armature, the latter being arranged to bear on the arm 5 to move the arm away from contact 7. If the magnets 12 were always energized by the current in wire 9, the circuit through the bell 2 would be continuously broken. To avoid this and yet leave the circuit 9 so that it will serve to break the circuit through any bell when desired, I provide a shunt-circuit around each magnet 12, which shunt is adapted to be broken to enable the magnet 12 to operate. This shunt-circuit is shown consisting of a wire 15, connected with one terminal of the magnet 12 and leading to a contact 16.

17 is a lever or armature connected with a wire 18, that leads to the armature 13.

19 is a contact, which the armature 13 engages when the magnet 12 is de-energized, the contact 19 leading by a wire 20 to the wire 9 to complete the shunt around the magnet 12. Thus when the shunt-circuit is closed the current from the wire 9 will pass around said magnet; but when the shunt-circuit is broken, as at 16 17, the magnet 12 will be energized and thereupon attract its armature 13, which will then move the arm 5 to break the circuit through the bell, at the same time breaking the shunt-circuit through 13 19, for a purpose hereinafter explained. Means for breaking the circuit through 9, so as to release the armatures 13 to restore the shunt-circuit at 13 19 and the circuits through the bells, are utilized and will be explained further on in this specification. The armatures 17 are actuated to break said shunt-circuits by means of magnets 21, that are located on spur-wires 22, leading from a main circuit 23, which passes through all the stations on a circuit. The wires 22 are connected with contacts 24 on the arms 5, which contacts are insulated from said arms, as shown. The contacts 24 may form a continuation of the arms 5, the parts thereof being separated by insulation 25, as shown, or otherwise arranged for the purpose.

26 represents contacts normally in engagement with the contacts 24 and connected by wires 27 with ground, as 4. When the circuit is established through wire 23, it passes through 22, 24, 26, and 27 to ground at 4, thus energizing the magnet 21, which thereupon attracts it armature 17, breaking the shunt-circuit at 16. The normally-closed circuit 9 now energizes magnet 12, which attracts its armature 13, breaking the shunt-circuit again at 19, and also moving the arm 5, which breaks the circuit 22 at 26 and also breaks the call-bell circuit 3 at 7, whereby that call-bell cannot be operated, thereby leaving the next call-bell at the next succeeding station in circuit to be operated, and so on successively, as desired, through all the stations on a circuit. Thus the call-bells of intermediate stations can be cut out, leaving a clear unbroken circuit between a calling-station and the call-bell at a station to be called. The circuit 22 through the magnet 21 being thus broken at 26, said magnet must be provided with a new ground, to prevent the current from the calling-station from passing to the next station and operating its magnet 21 before the proper action is taken at the calling-station to operate the magnet 21 at the next station, and so on. For this purpose I provide an extra circuit to ground 4, as follows: 28 is a wire leading from one terminal of the magnet 21 to a contact 29, carried by the armature 17 and insulated therefrom. The contact 29, as the armature 17 is attracted by its magnet 21, is adapted to engage a contact 30, from which a wire 31 leads to ground 4. By this means the circuit through 22 to ground 4 is maintained through 28, 29, 30, and 31, notwithstanding the break at 24 26; but even when a circuit through magnet 21 is broken and the shunt-circuit re-established at 16 17 it will be kept open to keep the bell-circuit broken until the circuit 9 is broken to permit the shunt-circuit to be restored at 13 19.

The operation of the features so far described is as follows: Suppose a party at station A desired to call a party at station B. It is merely necessary, then, to close the circuit through wire 1 by a push-button, or by the means hereinafter explained, whereupon the current will flow through the spur-wire 3 and bell 2 to ground 4, thereby giving the desired signal; but if a party at station A desires to call a party at station C the call-bell at the intermediate station must be cut out. To accomplish this the circuit through wire 23 must be closed, which then energizes magnet 21 at station B, which attracts its armature 17 and breaks the shunt-circuit at 16 17. The magnet 12 now becomes energized and attracts its armature 13, creating a further break in the shunt-circuit at 13 19 and also moving the arm 5, which breaks the circuit 3 through the bell 2 at 5 7, also breaking the circuit 22 at 24 26, which is maintained through 28 29 30 until the circuit 23 is broken at station A. When this last action takes place, as by removing the finger from a push-button or switch, the new ground at 29 30 is broken by the rising of armature 17, whereby the magnet 21 at the intermediate station is made inoperative and cannot be again energized until its ground-circuit at 24 26 is again established. The circuit through the call-bell at the intermediate station being thus broken enables the bell at the next station to be operated without operating the devices at stations beyond the called station. By keeping the shunt-circuit at the intermediate station broken prevents any other station from re-establishing the circuit through the bell at said intermediate station, so that interference is prevented. When the parties have finished with the line, they break the circuits 9 and 23, thus restoring all the parts to their normal conditions.

Figures 1, 2, 3:
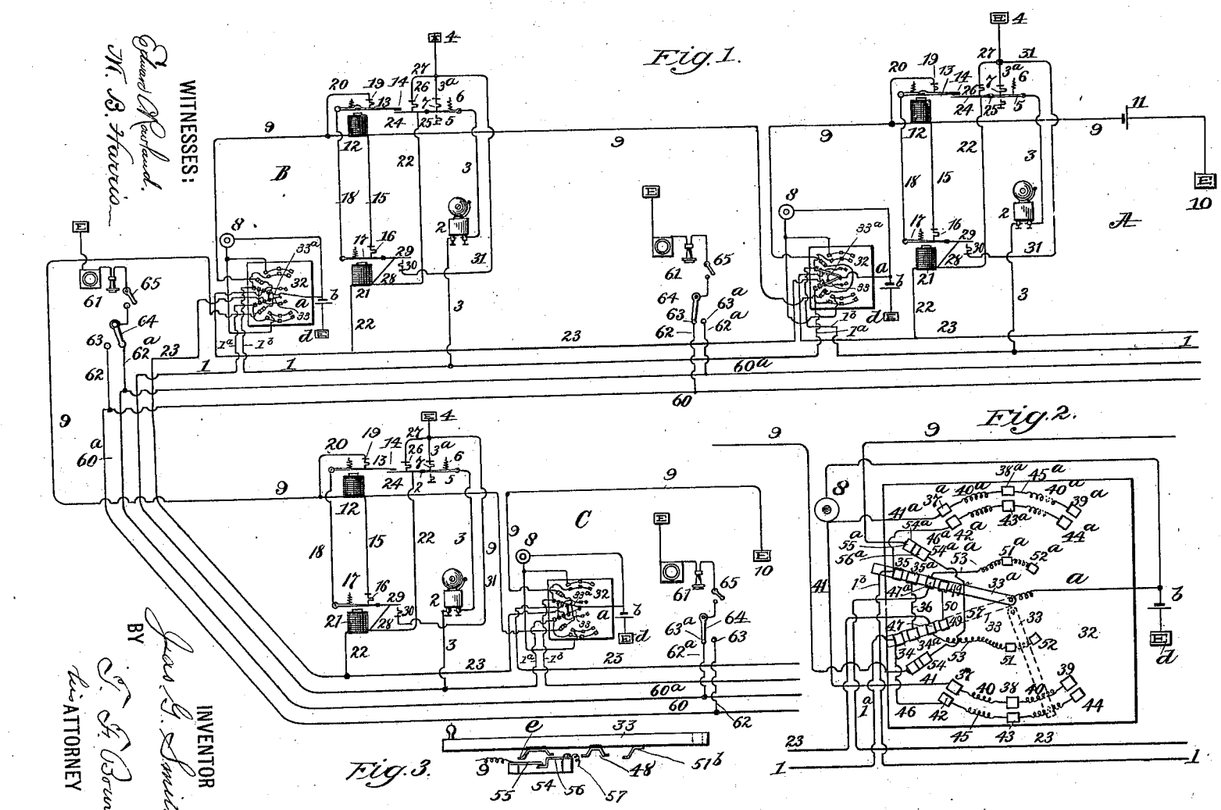
Figure 1 is a diagrammatic view of my improved system, showing the magnets and operating devices connected therewith in their normal positions.
Fig. 2 is an enlarged detail of devices for operating the several circuits.
Fig. 3 is a detail side view of an arm of the switch box or board, showing certain contacts to be operated by said arm.

In order to enable any station to be readily connected with any other station, while giving the operator as little trouble as possible, at the same time enabling the several circuits to be established and broken as needed, and for the further purpose of permitting a station to readily communicate with any other station on either side of it along the line, I have provided means as follows, Fig. 2 showing the devices on an enlarged scale: 32 is a switch board or box, which may be of suitable construction and located at each station. 33 33$^a$ are metal arms pivoted on the board or box 32 and connected by a wire $a$ with a battery $b$ and ground $d$, the arm 33 serving to direct the current to one side of its station and the arm 33$^a$ directing the current to the opposite side of the station. Fig. 2, in dotted and full lines, shows the normal positions of the arms 33 and 33$^a$, respectively. The bell-wire 1 divides at each board or box 32, one end 1$^a$ of the wire 1 leading to a contact 34 and the other end 1$^b$ leading to a corresponding contact 35, so that when the circuit from 34 to contact 35 is established the circuit through wire 1 will be complete, and when the circuit through contacts 34 or 35 is broken the circuit through wire 1 will also be broken. For this purpose contacts 34$^a$ 35$^a$ are provided, and they are connected by a wire 36. On each arm 33 33$^a$ is a contact $e$, insulated from said arms and adapted to respectively make electrical connection between the contacts 34 34$^a$ and 35 35$^a$ to complete the circuit through the wire 1. The parts are so arranged that when the arms 33 33$^a$ are at zero, or in the normal positions, the circuit will be established through 1$^a$, 34, $e$ (on arm 33), 34$^a$, 36, 35$^a$, $e$, (on arm 33$^a$,) 35, and 1$^b$, and when one arm is moved the circuit through wire 1 will be broken. By this means when one arm 33 or 33$^a$ is moved the circuit through the bell-wire 1 will be broken at the "calling-station" to prevent calling in both directions at once, or, in other words, to confine the calling to one side of the station.

When an arm 33 or 33$^a$ is moved to select another station, the circuit through wire 1 must be re-established in connection with the push-button 8 at the calling-station, which is effected as follows: 37 38 39 are contacts for contact $e$ on the arm 33, and 37$^a$, 38$^a$, and 39$^a$ are contacts for the contact $e$ on the arm 33$^a$, the number of these contacts corresponding to the number of stations on a circuit. The contacts 37 38 39 are connected by a wire 40, and the contacts 37$^a$, 38$^a$, and 39$^a$ are connected by a wire 40$^a$. The contact 37 is connected by a wire 41 with the push-button 8 and the contact 37$^a$ with said push-button by a wire 41$^a$, the circuit through said contacts and wires 41 41$^a$ being normally open at 8. The push-button 8 is connected with a suitable battery and ground, as $b$ $d$, or a separate battery and ground, if desired. 42 43 44 are contacts located adjacent to the contacts 37 38 39, respectively, forming pairs of contacts to be brought into electrical connection by the contact $e$ on the arm 33, and 42$^a$ 43$^a$ 44$^a$ are contacts to make pairs with the contacts 37$^a$ 38$^a$ 39$^a$ to be brought into electrical connection by the contact $e$ on the arm 33$^a$. The contacts 42 43 44 are connected by a wire 45, and the contacts 42$^a$, 43$^a$, and 44$^a$ are connected by a wire 45$^a$. The contact 42 is connected by a wire 46 with the contact 34, and the contact 42$^a$ is connected with the contact 35 by a wire 46$^a$. By this means when the arm 33 is moved the circuit through wire 1 is broken at 34 and re-established at 37 42 from the push-button 8 through 41, $e$, 42, 46, 34, and 1$^a$, and when the arm 33$^a$ is moved the circuit through wire 1 is broken at 35 and re-established at 37$^a$ 42$^a$ from the push-button 8 through 41$^a$, 37$^a$, $e$, 42$^a$, 46$^a$, 35, and 1$^b$. Thus when either arm 33 or 33$^a$ is moved the circuit through wire 1 is broken to cut off stations in the opposite direction on the circuit from the station desired to reach, and restored in the calling-station to permit the bells on the wire 1 to be operated only in the direction desired. If the arm 33 or 33ª is moved to the contact 37 or 37ª only, the circuit through wire 1 will be so established as to enable the bell at the next adjacent station desired to be operated; but if it is desired to call a station beyond said next adjacent station the call-bell at the last-mentioned station must be cut out to prevent it from being operated and to allow the bell at the station desired to be operated. This is accomplished as follows: The wire 23 is divided at each board or box 32, one part of said wire being connected with a contact 47 on a board or box 32, and the other part of the wire 23 is connected with a corresponding contact 47ª. To normally close the circuit 23 through 47 47ª, the arms 33 33ª are provided with contacts 48, insulated from said arms (see Fig. 3) and arranged to make connection between the contacts 47 47ª and other corresponding contacts 49 49ª, which are connected together by a wire 50. In this position the circuit through wire 23 is normally established through 47, 48, (on arm 33,) 49, 50, 49ª, 48, (on arm 33ª,) and 47ª, so that the wire 23 can be used by any station. When an arm 33 or 33ª is moved, the circuit through 23 is broken at 47 or 47ª and must be re-established to enable a magnet 21 at a succeeding station (or stations) to be energized to break the circuit through a bell 2 at that station. For this purpose I provide contacts 51 52 in line with the contacts 38 39, and contacts 51ª 52ª in line with the contacts 38ª 39ª, and on the arms 33 33ª are contacts 51ᵇ to engage the contacts 51 52 and 51ª 52ª, the parts being so arranged that the arm 33 will lie over the contacts 43 38 51 or 44, 39, and 52, and the arm 33ª will lie over contacts 38ª, 43ª, 51ª and 39ª, 44ª, and 52ª when moved thereover. The contacts 51 52 are connected together by a wire 53, that extends to the contact 47, and the contacts 51ª 52ª are connected by a wire 53ª, which extends to the contact 47ª. Now when the arm 33 is moved to the contact 38 the circuit through the bell-wire 1 is broken at 34 and re-established at 38 43, and the circuit through the wire 23 is broken at 47 and re-established at 51 51ᵇ. The battery b is thus included in the circuit 23, the current flowing therefrom through wire a to arm 33, thence through 51ᵇ to 51, 53, and 47 to 23, which energizes the magnet 21 at the next adjacent station on the left, which acts to break the circuit 3 through the bell at that station, leaving the circuit established to the bell 2 at the next or second station, which bell is operated by the push-button 8. If a station farther removed is desired, the arm 33 is moved to contacts 44, 39, and 52, which energizes the magnet 21 at the corresponding or second station, cutting out its bell 2, leaving the current free to the bell of the third station, and so on for as many stations as there are on the circuit, cutting out the bells of each intervening station successively as the arm is moved until a clear line is established for the bell at the station desired. When the arm 33 is next moved back to zero, it breaks the circuit 23 through the magnets 21, to restore the shunt-circuits at 16 17, as hereinbefore explained. A corresponding action occurs to the stations on the right of a calling-station when the arm 33ª is moved. At the time that the arm 33 or 33ª is moved away from zero and also back thereto, the circuit through the normally-closed line 9 should be broken to insure the restoration of the shunt-circuits at 13 19, so that the magnets 12 will not break the circuits 3 through the bells 2 until necessary. For this purpose the wire 9 is broken at the boards or boxes 32, the ends of which wire lead to normally-closed contacts 54 54ª, which are more clearly shown in Fig. 3. The contacts 54 54ª are shown composed of contact springs or pieces 55, 56, 55ª, 56ª, respectively, normally in engagement, as shown, the parts 55 55ª being connected with the ends of wire 9, and the parts 56 56ª being connected by a wire 57, through which parts the line 9 is kept normally closed. The contacts e on the arms 33 and 33ª are arranged to bear on the springs 55 or 55ª as said arms are moved to momentarily break the circuit through the line 9, thus restoring the shunt-circuits around magnets 12 as said arms are moved. (See Fig. 3.)

In connection with the signaling or calling devices I provide one or more telephone-lines 60, which have suitable telephone instruments 61, connected with the lines 60 by spur-wires 62. The wire 60 will be suitably grounded or arranged as found most desirable for a working circuit. In case a number of stations are located on a circuit, I preferably use two or more telephone-wires 60 60ª, the wires 60ª also having spur-wires 62ª for connection with the telephones 61. In this case the wires 62 62ª have contacts 63 63ª with which a switch 64 can make contact, so that the telephones 61 can be placed in circuit with either telephone-wire 60 or 60ª, and in same manner with any other wires that may be used. The circuit from the telephone 61 may be further provided with a switch 65 to break the circuit through the telephone if desired to cut the ground from the telephone-wire when not in use. By providing two or more telephone-circuits, as stated, a person can select either wire, but if one is in use he can select the other and by a code of signals can notify the party at another station which wire he intends to use, so that the latter party can connect his telephone by the switch 64 with the selected line. However, each station has a certain telephone-wire with which it is normally connected and a party at a calling-station will naturally switch his telephone to that wire without the necessity of sending special signals.

The complete operation of my improved system is as follows: Suppose a party at station A desires to communicate with a party at station B, which is the next adjacent station on the left. He first moves the arm 33 from zero, which is the normal position over the contact 34. This movement breaks the circuit through the bell-wire 1 at station A to prevent him from calling except in one direction from said station. As the arm 33 moves, its contact or projection $e$, passing over the contact 54, momentarily breaks the normally-closed line 9 to assure the restoration of the shunt-circuit through 13 19 and completing of the bell-circuit through wire 3. The arm 33 is then brought to rest over the contacts 37 42, the contact $e$ on said arm then closing the circuit through 37 42. This re-establishes the circuit through the bell-wire 1 to the left from the push-button 8 through 41, 37, $e$, 42, 46, 34, and $1^a$ to the spur-wire 3. A signal may now be given by the push-button 8, to notify the called station of the desire to communicate, the called party responding with his telephone. A signal can also be given indicating the telephone-wire 60 or $60^a$ to be used, the parties making suitable connections by the switches 64. When they have finished, the arm 33 is returned to zero, whereupon all parts will be restored to their normal positions. If the party at station A desires to call a station on the right, (not shown,) he moves the arm $33^a$, corresponding action of the parts taking place, excepting that the circuit through wire 1 will be closed from 8 through $41^a$, $37^a$, $e$, (on arm $33^a$,) $42^a$, $46^a$, 35 to $1^b$, and thus through the line 1 to the right. If a party at station A desires to call a station farther removed along the circuit, as C, the arm 33 is moved along until it reaches the contacts 38 and 43, (first cutting out the bell at station B, as before explained,) when the bell-circuit will be established from 8, through 41, 37, 40, 38, $e$, (on arm 33,) 43, 45, 42, 46, 34, and $1^a$ to the wire 1. At the same time the contact $51^b$ on the arm 33 engages the contact 51 to send a current through the magnet 21 at the first station B to cut out the bell at B. The circuit through the line 23 is now established from ground $d$, including battery $b$, through $a$, 33, $51^b$, 51, 53, and 47 to 23, the current from battery $b$ thus energizing magnet 21 at station B. Magnet 21 then attracts its armature 17, which breaks the circuit through the shunt 15 17 18 around the magnet 12, at the same time restoring the circuit 23 at 29 30, through 22, 21, 28, 29, 30, and 31 to ground 4, to keep magnet 21 energized and the shunt broken. The said shunt being broken, as stated, the magnet 12 becomes energized and attracts its armature 13, which again breaks the shunt at 13 19, so that if the magnet 21 became demagnetized from any cause the armature 13 would still remain attracted until the line 9 was broken. As the armature 13 (at B) thus moves it operates the arm 5, which immediately breaks the bell-circuit 3 at 7, cutting out the bell at the nearest station B, the arm 5 also breaking the circuit 22 at 26. The bell-wire 1 is now free to the station to be called, as C, and pushing the button 8 at the calling-station the station C can be signaled without operating the bell 2 at the intervening station. Thus by my invention a called station is reached without operating the devices at a station beyond. When the arm 33 is next moved back to zero, the circuit 23 will be broken at 51, thus releasing the armature 17 to restore the shunt at 16 17, and as the projection $e$ passes over the contact 54 the circuit through wire 9 will be broken to release the armature 13 on magnet 12 to fully restore the shunt, as well as the bell-circuit at 5 7 and the circuit 22 at 24 26. If a station farther removed along the circuit beyond C is to be called, the arm 33 will be moved across 38 to 39, thus first cutting out the bell 2 and magnet 21 at B, and then the bell and magnet at C, (through 39 and 52,) and so on through the circuit for all the stations, cutting out all the bells at the stations that intervene between a calling and a called station. If a station at the right of A is to be called, the arm $33^a$ will be operated, producing a similar action at intervening stations to that above described.

It will be understood that by my system any station on a circuit can select and call any other station desired by merely operating the arm 33 or $33^a$, according to which side of the calling-station the station to be called may be situated.

It will be further understood that by my system all the call-bells or signaling devices are normally in circuit with the line 1, and that to operate any desired bell on the line it is only necessary to remove or cut out the circuit in the bell or bells between a calling and a called station. It will also be observed that in my system the call-bell cut-out devices of the several stations operate individually and separately and not in unison—that is to say, only one circuit-breaker on a line operates at one time in response to a single impulse or pulsation in said line, and when said circuit-breaker has moved to break its corresponding call-bell circuit it does not operate again until after the whole line has been restored. Another point to be observed is that the line-wire 1 is normally divided into sections, as by the spur-wires 3, and that it is necessary to break the circuit through a spur-wire at one station before the line will be clear to the next station, and that to keep the line clear to any one station from another the circuit through any wire 3 must be held broken to permit the passage of the current to the next station.

Figure 4:
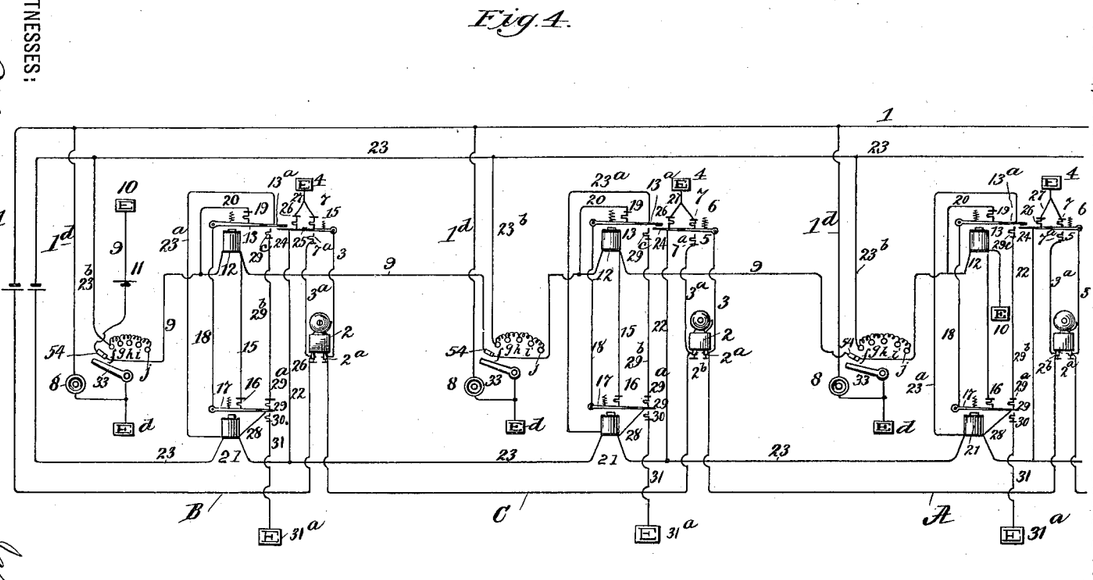
Fig. 4 is a diagrammatic view of my system, showing a few changes in some of the circuits.

In Fig. 4 I have shown a few slight changes in the manner of cutting out the bells 2 and magnets 21, consisting, principally, in providing shunts around said bells and magnets for the passage of the current, instead of merely cutting off the grounds for said bells and magnets; also, a slightly different manner of running the line 1 and its push-button 8 and of operating the circuit 23 at the switch board or box. In this instance the circuits 1 and 23 both operate solely in one direction through all the stations, instead of operating to the right or left only of a calling-station, as in Figs. 1 and 2. These arrangements may be operated as follows: The bells 2 are connected directly to the line-wire 1, the latter being connected to each binding-post $2^a$ $2^b$ of the bells 2, as shown. From the post $2^a$ the spur-wire 3 leads to the arm or lever 5 and to ground 4 through contact 7, as before explained. From the posts $2^b$ wires $3^a$ extend to contacts $7^a$, which are adapted to be engaged by the arms 5, when the latter are operated by the armatures 13, in which position a shunt around the bell is closed from $2^b$ through $3^a$ $7^a$ 5 3 to $2^a$, so that the current in wire 1 follows said shunt (when the latter is closed) to cut out the bell from the line 1; but as this shunt is normally broken at $7^a$ 5 the normal circuit through the bell is from 1 to $2^b$ through the magnet of the bell to $2^a$, 3, 5, and 7 to ground 4. The push-buttons 8 are normally in connection with the line 1, preferably through spur-wires $1^d$, leading from ground $d$. By this means, if a party at one station, as A, desires to call a party at station B it is merely necessary to push button 8 at A, when the circuit through the bell 2 at B will be closed from $d$, through 8 $1^d$ $2^b$ at B, bell-magnets 3, 5, and 7 to ground. If a party at a farther station, as C, is to be called from A the bell 2 at B is shunted from the line 1 by means of the magnets 21 and 12, as before explained, the shunt for the magnet 21 being established as follows: The magnets 21 are shown located directly on the line 23 the ground-circuits 22 being connected with wire 23 at one side of (beyond) the magnets 21. $29^a$ are contacts in normal engagement with the contacts 29 on the armatures 17. $29^b$ are wires leading from the contacts $29^a$ to contacts $29^c$, which are adapted to be engaged by contacts $13^a$, carried by and insulated from the armatures 13. The contacts $13^a$ are connected with wires $23^a$, which lead to the terminals of the magnets 21, opposite the wires 28, (or to the wires 23.) With this arrangement when the armature 13 at a station is attracted by its magnet 12 (through the breaking of the shunt 15 16 17 18 by magnet 21) the shunt around the corresponding magnet 21 will be closed at $13^a$ $29^c$, the shunt-circuit thus leading from 23 through $23^a$ $13^a$ $29^c$ $29^b$ $29^a$ 29 and 28 to 23, thus shunting the magnet 21 from the line 23. The secondary ground for the magnet 21 may be established from 28, 29, 30, and 31 to ground at $31^a$, instead of to ground 4, as before explained, when armature 17 is attracted. This shunt around the magnet 21 is established when the shunt at 16 17 is broken to cause the magnet 12 to attract its armature 13, and after the circuit through 23 is again broken to allow armature 17 to rise from its magnet. For this purpose I have shown a simple switching device consisting of contacts $f$ $g$ $h$ $i$ $j$, (one for each station on the line,) forming a set of contacts at each station, each set being connected by a spur-wire $23^b$ with the line 23. The arms 33, having contacts $e$, are connected with ground, as at $d$, and arranged to swing over the contacts $f$ $g$ $h$ $i$ $j$, and to make contact therewith. The contacts 54 in the normally-closed line 9 are so located that when the arm 33 is first moved it will operate the contact 54 to break the circuit through line 9, to restore the circuits controlled thereby. When an arm 33 is moved to a contact, as $f$, the circuit will be established from ground through 33 $e$ $f$ $23^b$ to 23, thereby energizing magnet 21, next in circuit on the line, which, by attracting its armature 17, breaks the shunt at 16 17, causing magnet 12 to attract its armature 13, thus closing the shunt from said magnet 21 at $13^a$ $29^c$, as well as breaking the ground through 22 at 24 26, and the ground through 3 at 5 7, and establishing the shunt for the bell 2 at 7 $7^a$, also creating the new ground for 23 at 29 30. If a station farther along the circuit is desired, the arm 33 will be moved to $g$, thus breaking the circuit 23 at $f$, so as to release armature 17, which moves back, breaking the ground at 29 30, re-establishing the shunt at 16 17, and also completing the shunt around the magnet 21 at 29 $29^a$, so that the current will flow around said magnet to the next magnet on the circuit, and so on successively through the contacts $h$ $i$ $j$, &c., to cut out the bells and magnets 21 at stations intervening between a calling and a called station.

I do not herein specifically claim the features illustrated in Fig. 4, as they are made the subject of a divisional application filed by me on February 23, 1895, Serial No. 539,360.

I claim as my invention—

1. A signaling system comprising three line wires, an electrical instrument connected with one of said wires, a spur wire therefrom, and a circuit breaker for said spur wire, another of said wires having a magnet, devices for operating said circuit breaker operated by the magnet, and a shunt around said magnet, the other of which line wires has a magnet to break said shunt, substantially as herein specified.

2. A signaling system comprising a line wire, an electrical instrument connected with a spur wire leading from said line wire, a circuit breaker for said spur wire, a normally closed line wire having a magnet and armature to operate said circuit breaker, a shunt around said magnet, an armature 17 to break said shunt, a magnet to operate said armature and a line wire to energize said magnet, as and for the purpose specified.

3. A signaling system comprising a line wire, a spur wire therefrom, an electrical instrument in circuit with said line wire, a circuit breaker for said spur wire, a normally closed line wire having a magnet and armature, the latter being arranged to operate said circuit breaker, a shunt around said magnet adapted to be broken by said armature, and another line wire having a magnet and armature, the latter being also arranged to break said shunt, and means for operating said magnets and instrument, as and when desired, as herein specified.

4. A signaling system comprising a line wire, a spur wire leading therefrom, a contact included in the spur circuit, a signaling instrument connected with said spur wire, a contact for connection with said first mentioned contact and leading to ground, a normally closed line having a magnet and armature, the latter being arranged to operate said first mentioned contact and insulated therefrom, a shunt around said magnet including said armature therein, a contact in said shunt to engage said armature, another line circuit having a magnet 21 and armature 17, the latter being included in the shunt and adapted to break the circuit through said shunt, and means for operating said magnet and instrument, as and for the purpose specified.

5. In an electrical signaling system, a plurality of wires, a plurality of stations located on said wires, one wire being normally electrically divided into sections, the other wire being undivided throughout all the stations, and circuit changing devices at each station connected with the through wire arranged to change the sections of the first mentioned wire so as to provide a through wire to a station, and to hold the circuit as thus formed to enable a calling station to signal to a desired station only, without affecting the signaling device at an intermediate station and without affecting the circuit changing devices in any station beyond the called station, substantially as specified.

6. In an electrical signaling system one wire maintained complete through all the stations, a second wire divided by earth-connection at each station, a third wire also divided by earth connection at each station, electrical devices at each station located in the second wire for operating electrical devices in the first wire at said stations to effect removal of earth connections from the second and third wires, signal devices located upon the third wire at each station and operative upon closing the circuit of said wire, as herein specified.

7. In an electrical signaling system comprising two or more stations, one wire complete through all the stations, a second wire having normal earth connection at each station, electrically operated circuit changing devices at each station arranged to effect removal of the earth connection of said wire at such station as required to enable the next station only to be reached by a through wire, said devices being arranged to hold such wire so established as a through wire at each intervening station while a similar change is being effected by similar means at other stations between a calling and a called station without affecting the circuit changing devices in any station beyond the called station, substantially as specified.

8. In an electrical system for signaling successively from any one station to any other of a number of stations upon the same line, one normally charged wire passing through all the stations, a second and third wire divided by earth connection at each station, devices at each station for closing and opening said second and third wires, devices at each station so arranged that the closing and opening of the second wire circuit at any station will remove the earth connection at each station successively until the desired station is reached, and the calling station enabled thereby to operate the signal instrument of such desired station without operating any intermediate signal instrument, substantially as herein specified.

9. In an electrical signaling system the combination of a continuous wire and two wires each of which latter has spurs or wire connections to earth at each station, and electrical circuit changing devices at each station for removing the said earth connections at such stations and means to make inoperative one of the electro magnetic devices by which the said earth connections have been removed, whereby a called station can be reached without affecting the circuit changing devices in any station beyond the called station, substantially as specified.

10. In an electrical signaling system having a plurality of stations, the combination of a normally closed line or circuit having an electro magnet included in it at each station, and two lines divided into sections by earth connections at each station, one of said wires including a signaling apparatus at each station, substantially as specified.

11. In an electrical signaling system the combination of three wires, one of which forms a normally closed circuit throughout, and the other two wires forming sections between stations by means of earth connections at each station, electrical devices in one wire operating electrical devices in another wire to effect connection successively through the intermediate stations to the station desired, substantially as herein specified.

12. The combination of a normally closed circuit and a contact to break said circuit, with a magnet and armature, the latter being arranged to operate said contact to break said circuit, a circuit for said magnet, a shunt around said magnet, and a magnet and armature, the latter being arranged to break said shunt, and a circuit for the last mentioned magnet, as and for the purpose specified.

13. The combination of a circuit and a contact arranged to break said circuit, with a magnet and armature, the latter being arranged to operate said contact to break said circuit, a shunt around said magnet, said armature being included in said shunt, and with another magnet and armature, the latter being included in said shunt to make and break the circuit therethrough, substantially as specified.

14. A signaling system comprising a line wire, a spur wire leading therefrom, a contact included in the spur circuit, a signaling instrument connected with said spur wire, a contact for connection with said first mentioned contact and leading to ground, a contact 24 operated with said first mentioned contact and insulated therefrom, a normally closed line having a magnet and armature, the latter being arranged to operate said first mentioned contact and insulated therefrom, a shunt around said magnet including said armature therein, a contact in said shunt to engage said armature, another line circuit having a magnet 21 located on a spur wire 22 leading from said line and an armature 17 for the magnet 21, the latter being included in the shunt and adapted to break the circuit through said shunt, and the spur wire 22 being connected with the contact 24 connected with the above-mentioned arm, the contact 24 normally engaging a contact 26 leading to ground, a wire 31 leading to ground and having a contact 30, a contact 29 connected with the armature 17 and insulated therefrom, and a wire 28 leading from a terminal of the magnet 21 to the contact 29, whereby when the circuit is broken at 24, 26, it will be re-established at 29, 30, substanntially as herein specified.

15. A signaling system having two wires, one of which is connected with a signaling instrument or call bell, another of said wires being used to cut out said instrument, combined with a switch-board or box having pivoted arms provided with contacts to normally close the circuit through the bell wire and arranged to break and re-establish said circuit when one arm is turned, means for sending a current through said bell wire when its circuit is so re-established, a contact connected with the cut out wire, and a contact operated by said arm to operate said cut out contact, substantially as herein specified.

16. A signaling system comprising the three wires, one of which is connected with a signaling instrument or call bell, another being a normally closed wire having devices to break the circuit through the call bell, and the other wire having devices to cause the normally closed line devices to operate, combined with a switch board or box having a pivoted arm connected with a battery, a pair of normally disconnected contacts connected with the bell wire and with a push button or switch respectively, a contact on said arm to close the circuit through said contacts, the normally closed line having a normally closed contact to be operated by said arm to break the circuit through said line, and a contact connected with the third-mentioned wire, and a contact operated by said arm to close the circuit through the last mentioned wire, substantially as herein specified.

17. A switch board or box having a pivoted arm connected with a battery, a series of contacts for connection with a push button or switch, a corresponding series of contacts for connection with a line wire, said contacts being arranged in pairs, a contact carried by and insulated from said arm and arranged to make connection between pairs of said contacts, and another contact or contacts connected with another line wire, a contact in said arm to engage therewith to close the circuit from said battery through said wire, substantially as specified.

18. A switch board or box having a pivoted arm, connected with a battery, a series of contacts for connection with a push button or switch, a corresponding series of contacts for connection with a line wire, said contacts being arranged in pairs, a contact carried by and insulated from said arm and arranged to make connection between pairs of said contacts, and another contact or contacts connected with another line wire, a contact in said arm to engage therewith to close the circuit from said battery through said wire, and a normally closed contact for connection with a normally closed line wire said arm when turned acting to break the circuit through said closed contact, substantially as herein specified.

19. A switch board or box comprising two pivoted arms connected with a battery, a signaling wire leading therethrough from opposite directions, one part of the wire being connected with a contact 34, and the other part with a contact 35, contacts $34^a$ and $35^a$ connected together and contacts $e$ on said arms, to join the contacts 34, $34^a$, and 35, $35^a$, respectively, contacts 42, 43, and $42^a$, $43^a$, connected with the contacts 34, 35, respectively and contacts 37, 38, and $37^a$, $38^a$, respectively connected with a push button or switch 8 by wires 41, $41^a$, the contact 37, 42, and 38, 43, as well as contacts $37^a$, $42^a$, and $38^a$, $43^a$, being arranged to be connected by the contacts $e$ on the arms 33 and $33^a$, as and for the purposes set forth.

20. A switch board or box comprising two pivoted arms connected with a battery, a signaling wire leading therethrough from opposite directions, one part of the wire being connected with a contact 34, and the other part with a contact 35, contacts $34^a$ and $35^a$, connected together and contacts $e$ on said arm to join the contacts 34, $34^a$, and 35, $35^a$, respectively, contacts 42, 43, and $42^a$, $43^a$, connected with the contacts 34, 35, respectively, and contacts 37, 38, and $37^a$, $38^a$, respectively connected with a push button or switch 8, by wires 41, $41^a$, the contacts 37, 42, and 38, 43, as well as contacts $37^a$ $42^a$, and $38^a$, $43^a$, being arranged to be connected by the contacts $e$ on the arms 33 and $33^a$, and contacts 47, $47^a$, for connection with another line wire, contacts 49, $49^a$, connected together, a contact 48 on each arm 33 and $33^a$, to connect contacts 47, 49, and $47^a$, $49^a$, respectively, and contacts 51, $51^a$, respectively connected with said other line wire, and adapted to be connected with contacts on the arms 33 and $33^a$, respectively, as and for the purposes specified.

21. A switch board or box comprising two pivoted arms connected with a battery, a signaling wire leading therethrough from opposite directions, one part of the wire being connected with a contact 34 and the other part with a contact 35, contacts 34ª, 35ª, connected together, and contacts e on said arms to join the contacts 34, 34ª, and 35, 35ª, respectively, contacts 42, 43, and 42ª 43ª, connected with the contacts 34, 35 respectively and contacts 37, 38, and 37ª 38ª, respectively connected with a push button or switch 8 by wires 41, 41ª, the contacts 37, 42, and 38, 43, as well as contacts 37ª, 42ª, and 38ª, 43ª, being arranged to be connected by the contacts e on the arms 33, 33ª, and contacts 47, 47ª, for connection with another line wire, contacts 49, 49ª, connected together, a contact 48 on each arm 33 and 33ª, to connect contacts 47, 49 and 47ª, 49ª, respectively and contacts 51, 51ª, respectively connected with said other line wire, and adapted to be connected with contacts on the arms 33, 33ª, respectively, and normally closed contacts 54, 54ª, for connection with a normally closed line, a projection on each arm 33 and 33ª, acting to operate the contacts 54, 54ª, respectively, to break said normally closed line, substantially as herein specified.

22. An electrical circuit comprising a line wire, an electrical instrument connected therewith, means for causing the latter to operate, a circuit breaking device in the circuit of said instrument, and a separate line wire having electrical devices for operating said circuit breaking device, combined with a telephone circuit for use when a signal is given in the calling circuit, substantially as herein specified.

23. An electrical circuit comprising a line wire, an electrical instrument connected therewith, means for causing the latter to operate, a circuit breaking device in the circuit of said instrument, and a separate line-wire having electrical devices for operating said circuit breaking device, combined with two telephone line wires having spurs therefrom provided with contacts 63, 63ª, and a switch 64 for connection with said contacts, and a telephone instrument connected with said switch, as herein specified.

24. An electrical circuit comprising a line wire, an electrical instrument connected therewith, means for causing the latter to operate, a circuit breaking device in the circuit of said instrument, and a separate line wire having electrical devices for operating said circuit breaking device, combined with two telephone line wires having spurs therefrom provided with contacts 63, 63ª, and a switch 64 for connection with said contacts, and a telephone instrument connected with a switch 65, in the circuit from the switch 64 to the telephone, substantially as herein specified.

25. A switch board or box having pairs of contacts 34, 34ª, and 35, 35ª, the contacts 34ª and 35ª being electrically connected together, normally closed contacts 54, 54ª, pairs of contacts 37, 42, and 37ª, 42ª, contacts 51, 51ª, and pivoted arms 33, 33ª, carrying contacts e, 48 and 51ᵇ, adapted to engage the contacts on the board or box, all arranged for joint operation substantially as herein specified.

26. In a signaling system having a plurality of stations, a wire passing through said stations and having branch connections at each station, and circuit changing devices located at each station arranged to operate one at a time and successively to break said branch connections at stations successively and to hold said branch connections broken to provide a through line to the station desired without affecting the circuit changing devices in any station beyond the called station, substantially as specified.

27. In a signaling system having a plurality of stations, a wire passing through said stations and normally in circuit with signaling devices at each station, circuit changing devices for preventing any intermediate one of said signaling devices from operating so that the instrument on the line next beyond can operate without affecting the circuit changing devices at or beyond the called station, and means for restoring said instruments to their proper circuits simultaneously, substantially as specified.

28. In a signaling system having a plurality of stations, a wire passing through said stations, a signal-instrument at each station normally in circuit with said wire, a separate wire passing through said stations, and circuit changing devices connected with said separate wire at said stations and arranged to cut said instruments from circuit with their wire at the intermediate station so as to provide a through wire to the signaling instrument at the station desired without affecting the circuit changing devices in any station beyond the called station.

In testimony that I claim the foregoing as my invention I have signed my name, in presence of two witnesses, this 11th day of January, 1895.

JAMES G. SMITH.

Witnesses:
 M. B. HARRIS,
 M. F. BOYLE.